United States Patent Office 3,444,209
Patented May 13, 1969

3,444,209
(O - AMINOPHENYL) - THIO - DIHYDRO - THIOPHENE-1,1-DIOXIDES AND THEIR DERIVATIVES
John R. Carson, Norristown, Pa., assignor to McNeil Laboratories, Incorporated, a corporation of Pennsylvania
No Drawing. Continuation-in-part of applications Ser. No. 636,569, Apr. 28, 1967, and Ser. No. 500,206, Oct. 21, 1965. This application Dec. 19, 1967, Ser. No. 691,712
Int. Cl. C07d 63/08
U.S. Cl. 260—332.1        6 Claims

ABSTRACT OF THE DISCLOSURE

The compounds are of the class of sulfolanes, useful for their ultraviolet absorption properties.

---

This application is a continuation-in-part of my co-pending application, Ser. No. 636,569 filed Apr. 28, 1967 now abandoned, which was co-pending with my application Ser. No. 500,206 filed Oct. 21, 1965, now abandoned.

This invention relates to a new series of organic compounds. More particularly, this invention relates to certain sulfolanes and to methods for their preparation.

The compounds of this invention may be represented by the following structural formula:

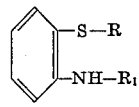

wherein R is a member selected from the group consisting of

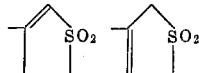

and $R_1$ is a member selected from the group consisting of H and —$SO_2CH_3$; the corresponding sulfones; and the acid addition salts and the loweralkyl quaternary ammonium derivatives of the basic nitrogen containing members.

The acid addition salts of the basic nitrogen containing compounds are prepared by treatment with an appropriate acid such as an inorganic acid; e.g., hydrochloric, hydrobromic, hydriodic, sulfuric, nitric or phosphoric; an organic acid such as acetic, propionic, glycolic, lactic, pyruvic, malonic, succinic, maleic, malic, fumaric, tartaric, citric, benzoic, mandelic, cinnamic, methane sulfonic, benzene sulfonic, salicylic, 2-phenoxybenzoic. Conversely, the salt form may be converted in the usual manner into the free base.

The novel basic nitrogen containing compounds may be converted into the corresponding quaternary ammonium compounds by reaction of the tertiary bases with alkylating agents, i.e., alkyl halides such as methyl iodide, ethyl bromide, propyl chloride; lower alkenyl halides such as allyl bromide; esters formed by reacting alkanols with an oxygen-containing acid such as dilower alkylsulfates, for example dimethylsulfate or diethylsulfate; lower alkylarylsulfonates such as methyl p-toluenesulfonate or aralkyl halides such as benzyl chloride. The quaternizing reaction may be performed in the presence of absence of a solvent, at room temperature or under cooling, at atmospheric pressure or in a closed vessel under pressure. Suitable solvents for this purpose are ethers such as diethylether and tetrahydrofuran, hydrocarbons such as benzene and heptane, ketones such as acetone and butanone, loweralkanols such as ethanol, propanol or butanol; or organic acid amides such as formamide or dimethylformamide. When lower alkyl halogenides are used as quaternizing agents, diethyl ether and benzene are the preferred solvents.

All the compounds of this invention, represented by Examples I through VIII, absorb ultra-violet (U.V.) light, making them useful as U.V.-screening materials. Because of their general solubility in organic materials, they may be used as U.V.-absorbers in plastics and resins, such as, for example, polystyrene, polyethylene, polypropylene, polyacrylics (e.g., methacrylate resins, polyacrylamides, polyacrylonitrile fibers, etc.), polyamide (e.g. nylon) fibers and polyester fibers. The inclusion of about 0.01–5.0 percent of the absorber, based on the polymer weight, is usually sufficient to render protection against ultra-violet light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of polymers into fibers, etc.

The product 4-[(o-aminophenyl)thio]-2,3-dihydrothiophene-1,1-dioxide is prepared by reacting o-aminobenzenethiol with epoxy-sulfolane in the presence of an alkali such as potassium hydroxide. The product 3-[(o-aminophenyl)thio]-2,5-dihydrothiophene-1,1-dioxide is prepared by reaction 4 - [(o - aminophenyl)thio] - tetrahydrothiophene-3-ol-1,1-dioxide with concentrated sulfuric acid. The product 2,3-dihydro - 4 - [(o-methylsulfonamidophenyl)thio]-thiophene-1,1-dioxide is prepared by reacting 3-[(o-methylsulfonamidophenyl)-thio] - 4 - methylsulfonyloxy-tetrahydrothiophene-1,1-dioxide with an alkali such as sodium hydroxide. The product 2,5-dihydro-3-[(o-methylsulfonamidophenyl)thio] - thiophene-1,1-dioxide is prepared by reacting 3-[(o-methylsulfonamidophenyl)thio]-thiophene-1,1-dioxide is prepared by reacting 3-[(o-methylsulfonamidophenyl)thio] - 4 - methylsulfonyloxytetrahydrothiophene-1,1-dioxide with an alkali such as sodium hydroxide and promptly thereafter acidifying the reaction mixture. The sulfones corresponding to the sulfide compounds are prepared by reacting the sulfide compounds with hydrogen peroxide in a suitable solvent such as acetic acid or acetone.

The following examples are intended to illustrate, but not to limit, the scope of the present invention.

Example I

To a solution of 2.5 grams (0.02 mole) of o-aminobenzenethiol and 1.12 grams (0.02 mole) of potassium hydroxide in 20 ml. of absolute ethanol is added 2.68 grams (0.02 mole) of epoxysulfolane. The mixture is refluxed for 30 minutes and then poured into water. The precipitate is extracted with chloroform, dried over magnesium sulfate and concentrated. The residue is crystallized from benzene and recrystallized from ethyl acetate. The product is 4-[(o-aminophenyl)thio]-2,3-dihydrothiophene - 1,1-dioxide; M.P. 165–166° C. Ultraviolet absorption: 232,302 mμ(ε=17,800, 4,060).

Example II

In a flask which has been swept with nitrogen, 52.5 grams (0.042 mole) of o-aminobenzenethiol is heated to 90° C. While the liquid is being stirred rapidly, 37.2 grams (0.28 mole) of epoxysulfolane is added over a period of one hour. The mixture is heated and stirred for 18 hours. The product is crystallized from benzene and is recrystallized from ethyl acetate and thereafter from ethyl acetate-hexane. The product is 4-[(o-aminophenyl)thio]-tetrahydrothiophene-3-ol-1,1 - dioxide; M.P. 103–105° C. Ultraviolet absorption: 240,308 mμ(ε=7,500, 3,760).

Example III

To 75 ml. of cooled, stirred concentrated sulfuric acid is added 16 grams (0.062 mole) of 4-[(o-aminophenyl)thio]-tetrahydrothiophene-3-ol-1,1-dioxide. The mixture is stirred until all of the solid goes into solution. The reaction mixture is diluted with water. The solution is then added to a 25 percent aqueous sodium hydroxide solution with cooling. The solid material is filtered, washed with water and crystallized from ethyl acetate and then recrystallized from benzene. The product is 3-[(o-aminophenyl)thio]-2,5-dihydrothiophene - 1,1 - dioxide; M.P. 129–131° C. Ultraviolet absorption: 242,309 m$\mu$($\epsilon$=11,700, 2,960).

Example IV

To a solution of 129.5 grams (0.50 mole) of 4-[(o-aminophenyl)thio] - tetrahydrothiophene-3-ol-1,1-dioxide in 2 liters of dry pyridine cooled to 5° C. is added 114.6 grams (1.0 mole) of methanesulfonyl chloride over a 30 minute period. The reaction mixture is stirred overnight at 0° C. and is then poured into 4 liters of ice water and crystallized by scratching. The solid is washed with acetone and recrystallized from acetone. The product is 3-[(o - methylsulfonamidophenyl)thio]-4-methylsulfonyloxytetrahydrothiophene-1,1 - dioxide; M.P. 168–169° C. Ultraviolet absorption: 225 m$\mu$($\epsilon$=11,110).

Example V

To a solution of 0.415 gram (0.001 mole) of 3-[(o-methylsulfonamidophenyl)thio] - 4 - methylsulfonyloxytetrahydrothiophene-1,1-dioxide in 5 ml. of ethanol is added 1 ml. of 1 N sodium hydroxide solution. The mixture is stirred for 2 hours at room temperature and 1 hour at steam bath temperature. The mixture is then added to dilute sodium hydroxide solution, the solution is washed with chloroform and is then acidified with hydrochloric acid. The solid product is 2,3-dihydro-4-[(o-methylsulfonamidophenyl)thio] - thiophene-1,1-dioxide; M.P. 185–187° C. Ultraviolet absorption 233 m$\mu$($\epsilon$=16,500).

Example VI

A 73 gram (0.18 mole) quantity of 3-[(o-methylsulfonamidophenyl)thio] - 4 - methylsulfonyloxytetrahydrothiophene-1,1-dioxide is dissolved in excess 5 percent aqueous sodium hydroxide solution. The alkaline solution is promptly acidified with 1 N hydrochloric acid. The solid material separating is dried and recrystallized from chloroform. The product is 2,5-dihydro-3-[(o-methylsulfonamidophenyl)thio] - thiophene - 1,1 - dioxide; M.P. 140.5–141° C. Ultraviolet absorption: 227,267 m$\mu$($\epsilon$=12,700, 4,100).

Example VII

A 110 ml. quantity of a 30 percent aqueous solution of hydrogen peroxide is added to a suspension of 31 grams (0.097 mole) of 2,5-dihydro - 3 - [(o-methylsulfonamidophenyl)thio]-thiophene-1,1-dioxide in 250 ml. of glacial acetic acid. The reaction mixture is stirred overnight and is then poured on cracked ice. The resulting crystals are washed with water and recrystallized from ethanol. The product is 2,5-dihydro-3-[(o-methylsulfonamidophenyl) sulfonyl]-thiophene-1,1-dioxide; M.P. 170.5–171° C. Ultraviolet absorption: 238,281 m$\mu$($\epsilon$=5,560, 2,260).

Example VIII

Using the procedure of Example VII and replacing 2,5-dihydro-3-[(o-methylsulfonamidophenyl)thio] - thiophene-1,1-dioxide with equivalent amounts of the products of Examples I, III, V and VI, the products obtained are 4-[(o - aminophenyl)sulfonyl]-2,3-dihydrothiophene-1,1-dioxide, 3-[(o-aminophenyl)sulfonyl] - 2,5 - dihydrothiophene-1,1-dioxide, 2,3-dihydro-4-[(o - methylsulfonamidophenyl)sulfonyl]-thiophene-1,1-dioxide and 2,5-dihydro-3-[(o - methylsulfonamidophenyl)sulfonyl] - thiophene-1,1-dioxide.

I claim:
1. A member selected from the group consisting of sulfolanes having the formula

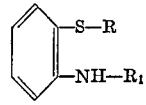

wherein R is a member selected from the group consisting of

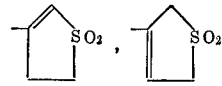

and $R_1$ is a member selected from the group consisting of H and —$SO_2CH_3$; the corresponding sulfones; and the nontoxic acid addition salts of the basic nitrogen containing members.

2. 4-[(o-aminophenyl)thio] - 2,3 - dihydrothiophene-1,1-dioxide.
3. 3-[(o-aminophenyl)thio] - 2,5 - dihydrothiophene-1,1-dioxide.
4. 2,3-dihydro-4-[(o - methylsulfonamidophenyl)thio]-thiophene-1,1-dioxide.
5. 2,5-dihydro-3-[(o - methylsulfonamidophenyl)thio]-thiophene-1,1-dioxide.
6. 2,5-dihydro - 3 - [(o-methylsulfonamidophenyl)sulfonyl]-thiophene-1,1-dioxide.

References Cited

UNITED STATES PATENTS 3,357,996   12/1967   Cobb _____ 260—332.1

HENRY R. JILES, *Primary Examiner.*

C. M. SHURKO, *Assistant Examiner.*

U.S. Cl. X.R.

260—45.8